United States Patent
Newkirk

[11] Patent Number: 5,899,117
[45] Date of Patent: May 4, 1999

[54] BAR END

[76] Inventor: Joel H. Newkirk, 17452 Reveilo Dr., Pacific Palisades, Calif. 90272

[21] Appl. No.: 08/914,432

[22] Filed: Aug. 19, 1997

Related U.S. Application Data

[63] Continuation-in-part of application No. 08/212,209, Mar. 11, 1994, abandoned, and a continuation of application No. 08/501,784, Jul. 13, 1995, abandoned.

[51] Int. Cl.$^6$ .................................................. B62K 21/12
[52] U.S. Cl. ............................ 74/551.8; 74/551.1; 403/93
[58] Field of Search ............................... 74/551.5–551.8; D12/178; 280/279; 403/103, 375, 87, 93, 98

[56] References Cited

U.S. PATENT DOCUMENTS

| | | | |
|---|---|---|---|
| 282,297 | 2/1883 | Garden | D12/178 |
| D. 334,164 | 3/1993 | Klieber | 74/551.8 |
| D. 346,145 | 4/1994 | Jeshurun et al. | D12/178 |
| D. 346,574 | 5/1994 | Jeshurun et al. | D12/178 |
| D. 347,613 | 6/1994 | Jeshurun et al. | D12/178 |
| D. 351,577 | 10/1994 | Dietz | D12/178 |
| 4,750,754 | 6/1988 | Lennon | 74/551.1 |
| 5,094,322 | 3/1992 | Casillas | 74/551.8 |
| 5,154,094 | 10/1992 | Klieber | 74/551.8 |
| 5,197,350 | 3/1993 | Borromeo | 74/551.8 |
| 5,235,871 | 8/1993 | Yamazaki et al. | 74/551.8 |
| 5,285,696 | 2/1994 | Taylor | 74/551.1 |
| 5,285,698 | 2/1994 | Liao | 74/551.8 |
| 5,301,570 | 4/1994 | Li | 74/551.1 |
| 5,319,994 | 6/1994 | Miller | 74/551.8 |
| 5,421,220 | 6/1995 | Chen | 74/551.8 |
| 5,425,285 | 6/1995 | Cheng | 74/551.8 |
| 5,570,614 | 11/1996 | Nastrucci | 74/551.1 |

FOREIGN PATENT DOCUMENTS

| | | | |
|---|---|---|---|
| 886661 | 10/1943 | France | 74/551.1 |
| 3628649 | 3/1988 | Germany | 74/551.1 |
| 4-143185 | 5/1992 | Japan | 74/551.8 |
| 91/04903 | 4/1991 | WIPO | 74/551.8 |

Primary Examiner—Vinh T. Luong
Attorney, Agent, or Firm—Norton R. Townsley

[57] ABSTRACT

A bar end for the end of the type of bicycle handlebar which is generally straight and has ends projecting at right angles to the bicycle is disclosed. The preferred embodiment of the bar end comprises a central clamp to which is affixed a generally forward sweeping tube and a generally rearward sweeping tube. The rearward sweeping tube has a downward portion extending downward and rearward from the clamp and a horizontal portion extending rearward, approximately horizontally, from the downward portion. The forward sweeping tube has an upper portion extending upwards and forwards at an angle from the clamp, and an inwards portion extending forwards and inwards at an angle from the upper portion. Variations of this embodiment are provided by varying the angular relationships, lengths and shapes of the segments and by providing a mechanism for vertical, angular adjustment of the forward sweeping tube. In another alternative, the bar end is permanently affixed to the termini thus creating a complete handlebar.

16 Claims, 8 Drawing Sheets

BAR END

CROSS REFERENCE

This application is a continuation in part of abandoned application Ser. No. 08/212,209, filed Mar. 11, 1994 and a continuation of abandoned application Ser. No. 08/501,784 filed Jul. 13, 1995.

BACKGROUND OF THE INVENTION

1. Field of the Invention

This invention relates to the field of bicycles and more particularly to bar ends which can be attached to the extreme ends of straight handlebars to enable multiple modes of riding the bicycle.

2. Description of the Related Art

The first chain and pedal driven bicycle was produced around 1890. Since then bicycle design has undergone many different technological changes. For example, the first bicycles were made of steel tubing, which although strong is quite heavy, whereas today, bicycles are more typically made of aluminum and even titanium tubing because of their light weight. Also, the first bicycles had no gearing while today, bicycles with twenty-one gear ratios (also called speeds) are commonly available. The purpose of gearing is to allow riders to handle different conditions encountered en route. Low gears are used for climbing while high gears are used for going down steep hills and for speed on level terrain.

Handlebar design has also undergone some significant changes. The first handlebars curved back from the steering post towards the rider. This made the rider assume an erect (sometimes called the "sit up and beg") position. However, in this position the rider presents a large frontal area which produces great wind resistance.

As bicycle racing became more popular drop handlebars became more popular. These handlebars have a lower U-shaped loop. They force the rider to adopt a hunched position over the handlebars (also called the tuck position) thus lowering wind resistance and enabling the racer to apply more force to the pedals. However, it is tiring to hold this hunched over position for long periods of time. To relieve fatigue riders sit up and place their hands on the cross bar which is higher than the U-shaped loop.

Nowadays, mountain biking has become popular. The mountain bike, while still lightweight, is sturdier than the racing bicycle and is designed for off-road riding. It has more rugged tires so that it can traverse mountain trails as well as pavement. The typical mountain bike has a straight across handlebar which forces the rider to assume the erect position which is good for a variety of different off-road conditions. However, the straight across handlebar does not provide the flexibility to allow the rider to adapt his riding position to the other terrain that is encountered on a typical on-road bike ride. The straight across handlebar does not allow the rider to adopt the aerodynamic, tuck position necessary to lower wind resistance when climbing, going downhill or racing. Neither does the bar end which attaches to the end of the straight handlebar and extends forward and inward.

So today when a person wants to buy one bicycle for general use, or to fulfill several purposes, he or she is faced with a variety of choices and compromises. If a person does not need speed he or she may purchase a standard bike with backward curving handlebars. The person will ride in maximum comfort but may sacrifice the ability to ride at maximum speed. If a person enjoys riding fast he or she may purchase a racing bike. However, if a person wants to ride on mountain trails, purchase of a mountain bike is indicated. A mountain bike is quite useable around town but its straight across handlebar means that the person will sacrifice the ability to ride at maximum speed and the ability to ride in maximum comfort. One bar end available for the mountain bike is one that extends forward and inward. This bar end is good for rugged and difficult off-road riding with steep terrain.

U.S. Pat. No. 5,421,220 (see FIG. 7) has been issued for another type of auxiliary handlebar. This handlebar comprises a main body having a spherical connection portion designed to fit securely over one end of the handlebar of a bicycle. The main body extends in one direction to form a hollow curved rod with a tapered joint in the opposite direction to form a straight rod. The tapered joint is provided with a through hole and a communicating cavity. A rotatable rod is adjustably fastened to the tapered joint.

The majority of the bikes made and sold today are of the mountain bike type, but many riders use them for on-road riding. They come with a straight handlebar and the only option for greater riding flexibility when adding to the ends of the straight handlebar is a bar end that extends forward and inward. There is no "drop" position.

What the industry needs is a handlebar which will enable riders to choose, at will, an erect position for maximum comfort; a crouched down position for maximum speed; an aerodynamic position for handling wind, climbs or going down steep hills; or a crouched down position with arm support. Development of a bar end which could accommodate all these riding positions would represent a great improvement in the field of bicycle bar end design, would make the mountain (or cross or hybrid) bike a much more flexible vehicle, and would satisfy a long felt need of the bicycle riding public.

SUMMARY OF THE INVENTION

This invention is a bar end which attaches to the end of the type of bicycle handlebar which is straight and has ends projecting at right angles to the bicycle. This is the type of handlebar typically found on a mountain bike. The preferred embodiment of the bar end comprises a central clamp to which is affixed a generally forward sweeping tube and a generally rearward sweeping tube. The rearward sweeping tube has a downward portion extending downward and rearward from the clamp and a horizontal portion extending rearward, approximately horizontally, from the downward portion. The forward sweeping tube has an upper portion extending upwards and forwards at an angle from the clamp, and an inwards portion extending forwards and inwards at an angle from the upper portion.

The angular relationships and lengths of the various segments can be varied to provide alternative embodiments. In another embodiment the downward portion can be U-shaped. In yet another embodiment, the angular path of the forward sweeping tube is adjustable by means of a vertically aligned, rotating clamp. To utilize this invention two bar ends, one right- and one left-hand are attached, via the clamp, at right angles to each end of the straight handlebar. The clamp can be clamped to the handlebar at any angle of tilt. Thus the user can select an angle which provides most comfort. In yet another alternative embodiment, bar ends are permanently affixed to the ends of a handlebar thus creating a new, integral handlebar. In this alternative, the angle of tilt of the bar ends is not user adjustable.

The bar end and handlebar combination is designed and shaped to allow riders to ride in several different erect positions, or several different crouched down positions, or in a crouched down position with arm support, at will. The bar end of this invention is unique. It attaches to the extreme end of a straight across handlebar and has a drop portion. The drop portion is extremely useful because it provides additional benefits not available with other bar ends currently on the market.

An appreciation of the other aims and objectives of the present invention and a more complete and comprehensive understanding of it may be achieved by referring to the accompanying drawings and studying the following description of the preferred embodiments.

DETAILED DESCRIPTION OF THE INVENTION

Figure 1:
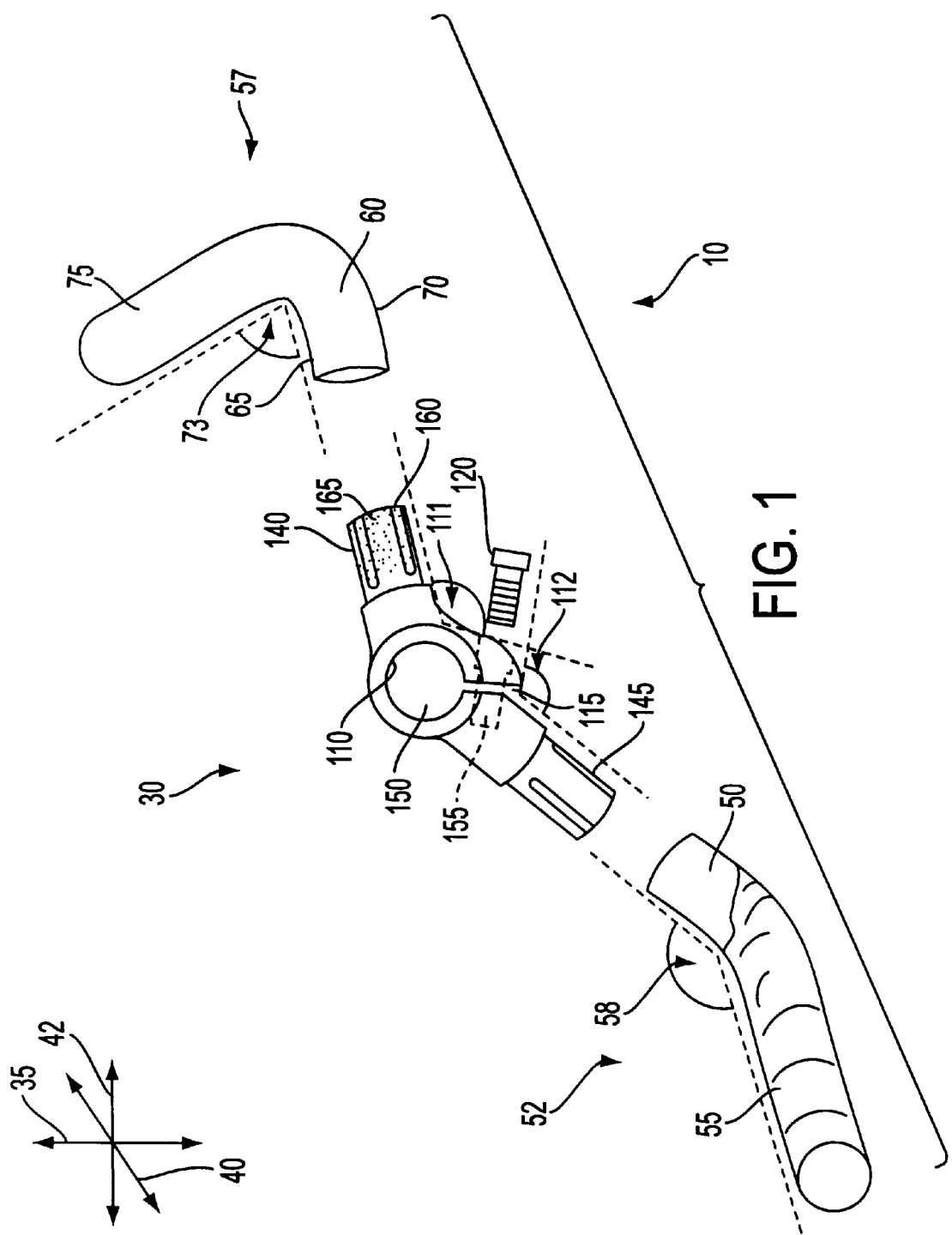
FIG. 1 is an exploded, perspective view of the preferred, right hand embodiment of this invention.

FIG. 1 is an exploded, perspective view of the preferred embodiment 10 of this invention. The bar end 10 comprises a rear tube 52, a medial clamp section 30 and a forward tube 57. The clamp section 30 comprises a circumferential clamp 110 with forward and rear projections 140, 145. The circumferential clamp 110 has a circular opening 150 and small circumferential gap 115. This gap is bridged by a bolt or screw 120 which is tightened into a threaded socket 155. When the bolt or screw 120 is tightened, the circumference of the clamp 110 is uniformly reduced. This clamp 110 is capable of applying tremendous clamping pressure. The clamp section 30 may be considered to have a vertical axis 35, a horizontal axis 40 and a transverse axis 42. These axes apply equally to the entire bar end 10 as well as the clamp section 30.

The forward and rear projections 140, 145 are not coplanar and join the clamp 110 at complex first and second angles 111, 112. The forward and rear projections 140, 145 can extend from the clamp section 30 at any desired first and second angle 111, 112. Preferably, in relation to the vertical axis 35, the horizontal axis 40, and the transverse axis 42, the forward projection 140 projects upwards and inwards from the clamp 110 and the rear projection 145 projects downwards and rearwards from the clamp 110. The projections are adapted to receive the tubes 52, 57 and preferably have grooves 160 for retention of adhesive 165. For optimum strength the clamp section 30 is made from a forging.

Affixed to the rear projection 145 is the rear tube 52. Preferably the rear tube 52 is affixed to the rear projection 145 with adhesive 165. However, the rear tube 52 could also be attached to the rear projection 145 by welding or brazing or equivalent methods of permanent attachment. The rear tube 52 has two segments: a downward pointing portion 50 and a horizontal portion 55 which are at a fourth angle 58 to each other. In the preferred orientation, as shown on FIG. 1, the downward portion 50 extends downward and rearward at a first angle 112 from the clamp 110 and the horizontal portion 55 extends rearward, approximately parallel to the horizontal axis 40.

Affixed to the forward projection 140 is the forward tube 57. Preferably the forward tube 57 is affixed to the forward projection 140 with adhesive 165. However, the forward tube 57 could also be attached to the forward projection 140 by welding or brazing or equivalent methods of permanent attachment. The forward tube 57 has two segments: an upwards pointing portion 60 and inwards pointing segment 75. In the preferred orientation, as shown on FIG. 1, the upper portion 60 extends generally upwards at a second angle 111 from the clamp 110 and the inner portion 75 extends forwards and inwards at a third angle 73 from the upper portion 60. The upper portion 60 has an inner side 65 and an outer side 70.

The tubes 52, 57 may be made of steel but are preferably made from ⅞ inch diameter aluminum tubing. The preferred dimensions of the tubes 52, 57 are: downward portion 50—approximately 3⅓ inches long; horizontal portion 55—approximately 3⅓ inches long; upper portion 60—approximately 3⅓ inches long; and inwards portion 76—approximately 3⅓ inches long. The preferred fourth angle 58 between the downward portion 50 and horizontal portion 55 is 60°. The preferred third angle 73 between the upper portion 60 and inwards portion 76 is 60°.

Only a right-hand bar end 10 is shown in FIG. 1. This is intended to be attached to the extreme rightmost end or terminus of a handlebar of a mountain bicycle as will later be described. Since bicycles in general and handlebars in particular have a right and left side, a left-hand bar end, which is a mirror image of the right-hand bar end shown on FIG. 1 is also part of this invention, as will also later be described.

While a circumferential clamp 110 may be the preferred method of attachment it will be obvious to those skilled in the art to which this invention pertains that equivalent methods of attachment can be devised.

Throughout the remainder of this specification an "a" suffix to the reference number will be used to designate the right side and a "b" suffix will be used to designate the left side. Lack of a suffix will indicate lack of right- and left-hand versions or, generically, both versions.

Figure 2:
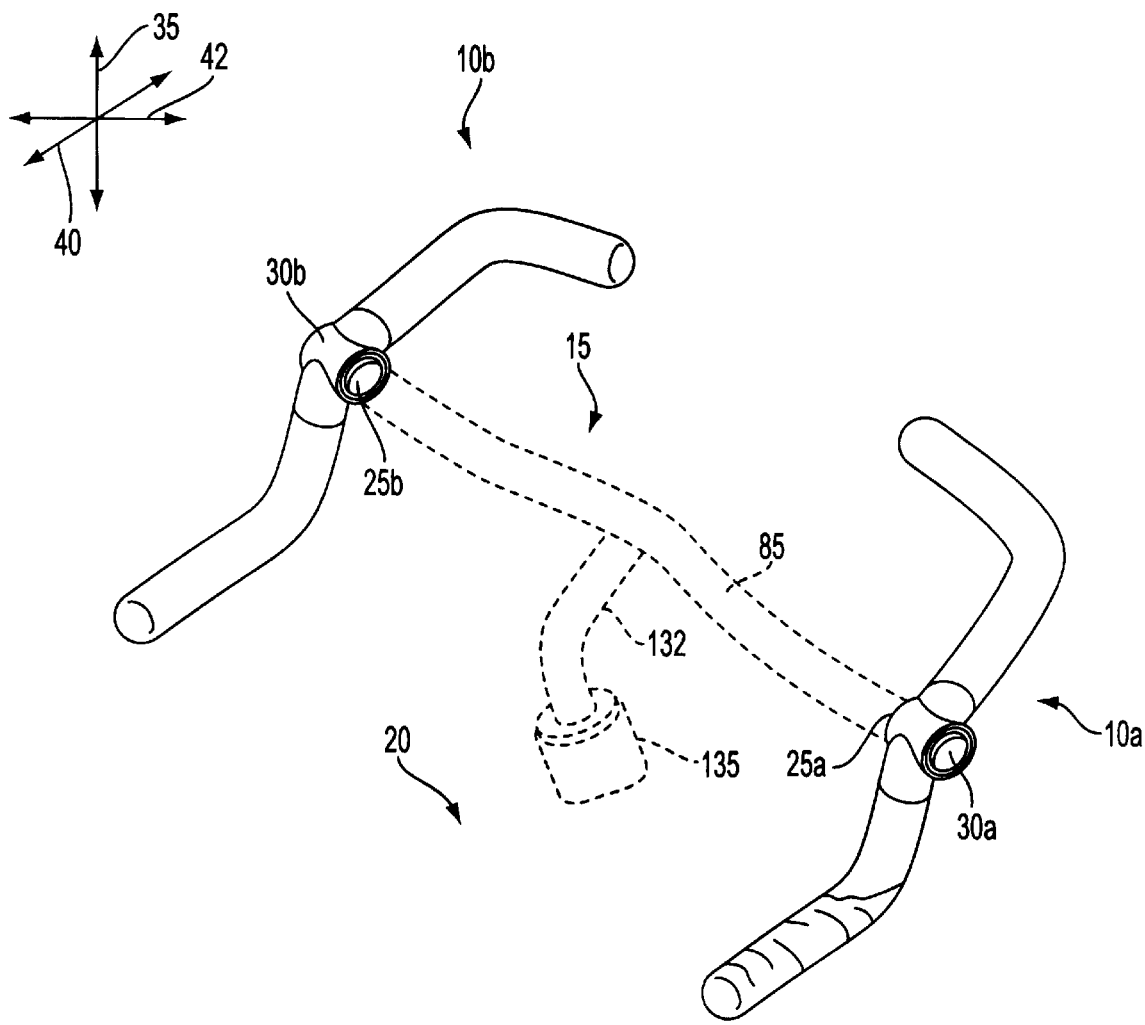
FIG. 2 is a partial perspective view illustrating a pair of the preferred embodiments of this invention (right and left hands) attached to the ends of the straight across handlebar of a mountain bicycle.

FIG. 2 is a partial perspective view illustrating a pair of the preferred embodiments of this invention 10a and 10b attached to the extreme outer ends or termini 25a and 25b of a straight across handlebar 15 of a mountain bicycle 20. The handlebar 15 is attached to a stem 132 which is attached to the bicycle 20 by a conventional attachment mechanism 135.

In FIG. 2, the clamp sections 30 are shown so that their horizontal axes 40 are approximately horizontal. Obviously, however, when the clamps 110 are loosened, the bar ends 10 can rotate about the termini 25 of the crossbar 85. Thus the bar ends 10 can be fastened at varying angles of rotation to the crossbar 85.

Figure 3:
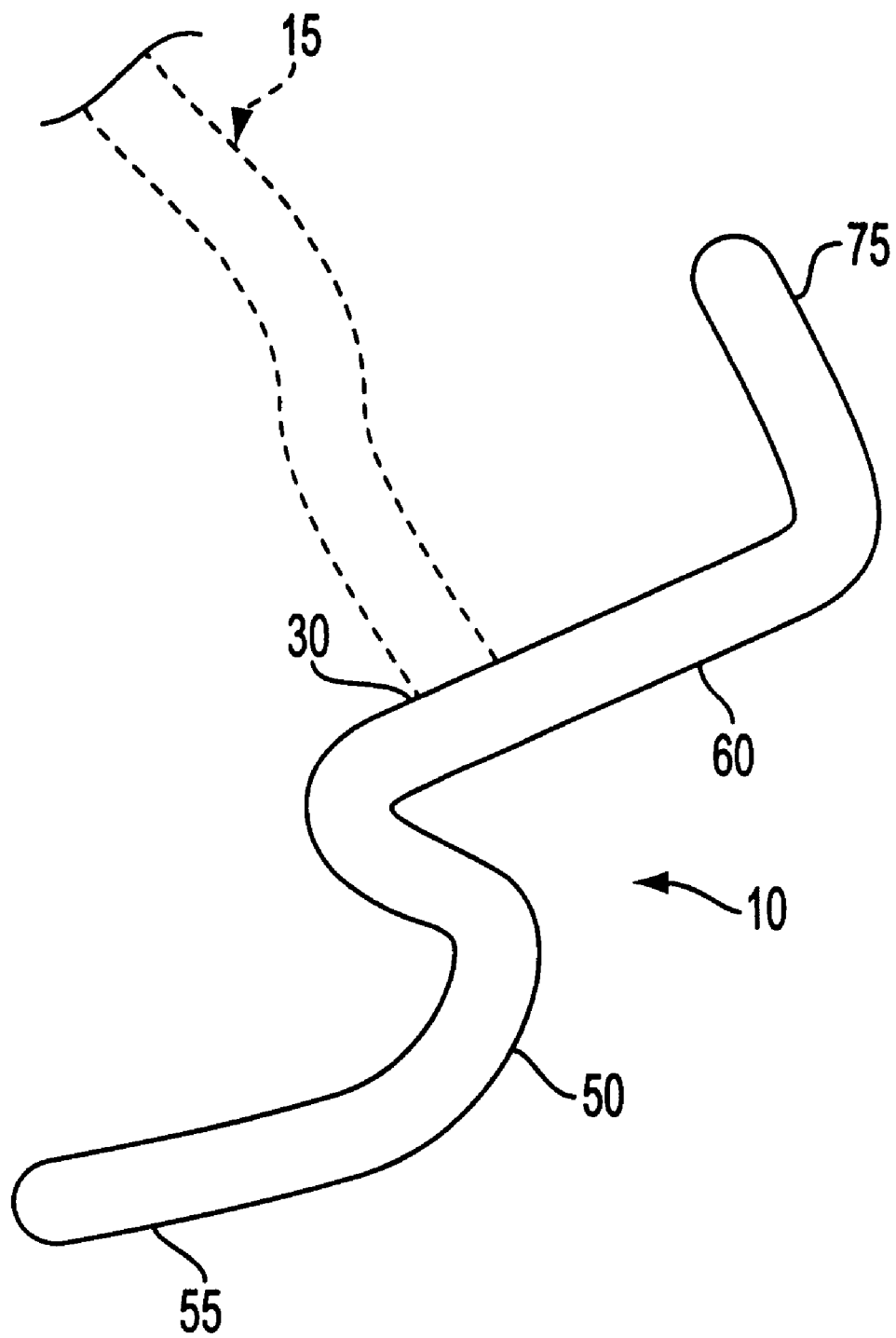
FIG. 3 is a partial, perspective view of a variation of this invention having a U-shaped lower portion.

FIG. 3 is a partial, perspective view of a variation of this invention 10 having a U-shaped downward segment 50.

Figure 4A:
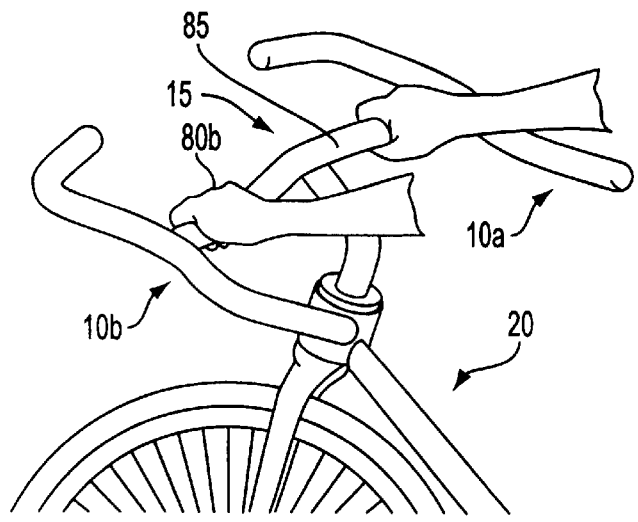
FIG. 4A is a partial, perspective view illustrating a bicycle rider riding with hands on the original handlebar provided with the mountain bicycle.
Figure 4B:
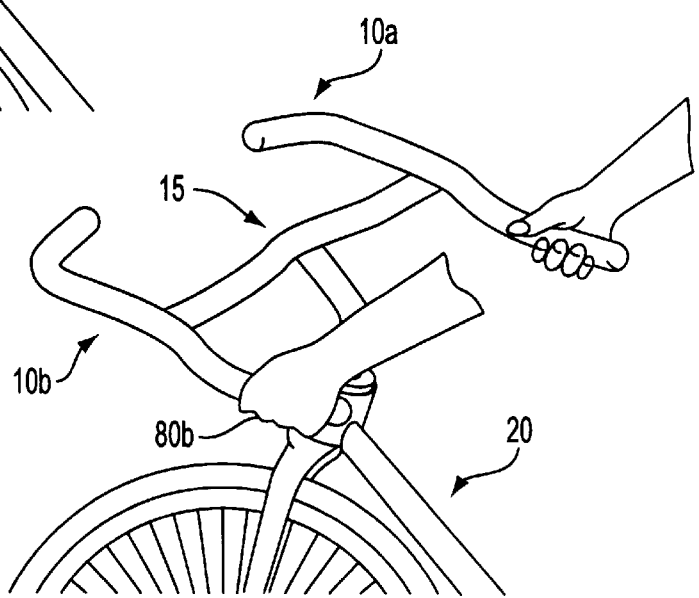
FIG. 4B is a partial, perspective view illustrating a bicycle rider riding with hands on the horizontal segment of the rear tube of the bar end.
Figure 4C:
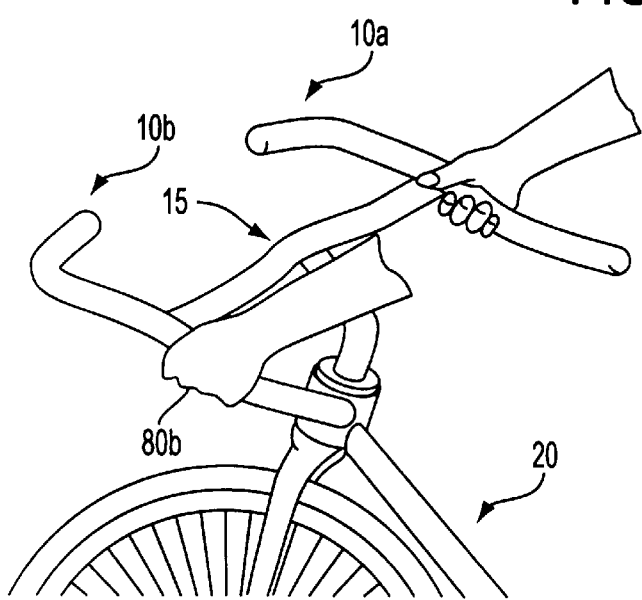
FIG. 4C is a partial, perspective view illustrating a bicycle rider riding with hands on the downward segment of the rear tube of the bar end.
Figure 4D:
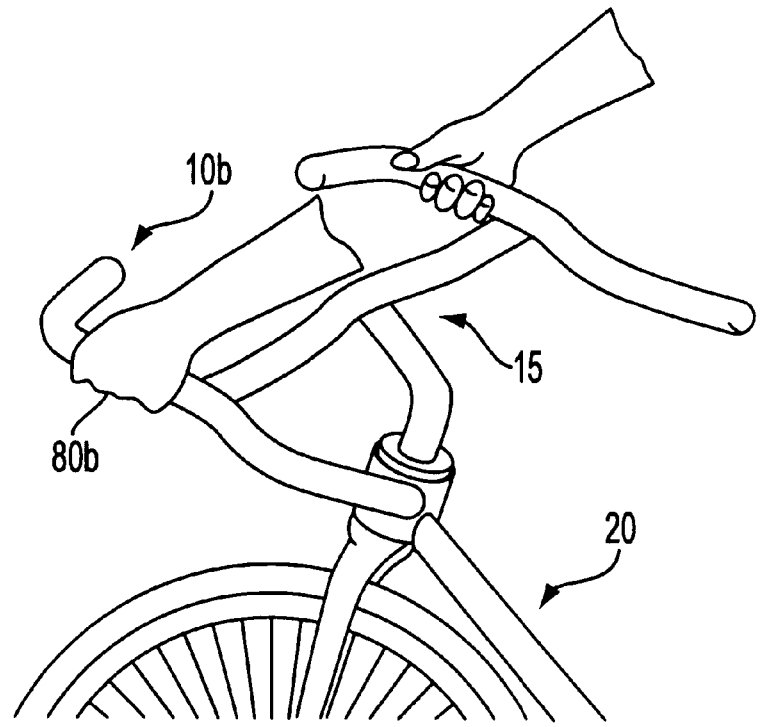
FIG. 4D is a partial, perspective view illustrating a bicycle rider riding with hands on the upward segment of the forward tube of the bar end.
Figure 4E:
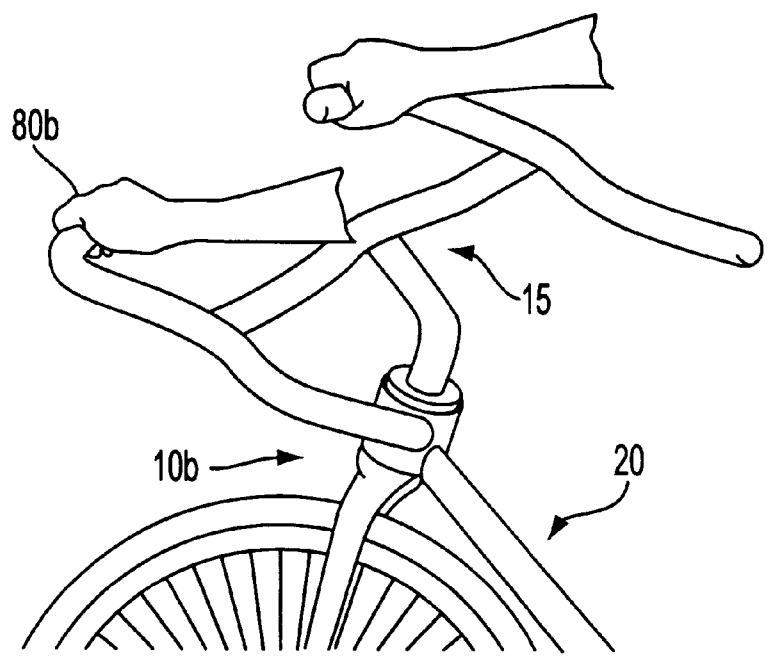
FIG. 4E is a partial, perspective view illustrating a bicycle rider riding with hands on the inward pointing segment of the forward tube of the bar end.

FIGS. 4A through 4E illustrate different ways the bar end 10 can be used when riding the bicycle 20. The hands 80 can be placed in the "normal" position on the crossbar 85. See FIG. 4A. Alternatively, the hands 80 can be placed on: the horizontal portion 55, as shown in FIG. 4B; the downward segment 50, as shown in FIG. 4C; the upper segment 60 as shown in FIG. 4D; or the inwards segment 75, as shown in FIG. 4E. Placing the hands 80 on the inwards portion 75 allows support of the forearm on the ends 25 of the handlebar 15. Placing the hands 80 on the different segments of the bar end 10 will allow the rider to take up a more erect or more hunched over position to accommodate his or her desire for speed or comfort.

Figure 5:
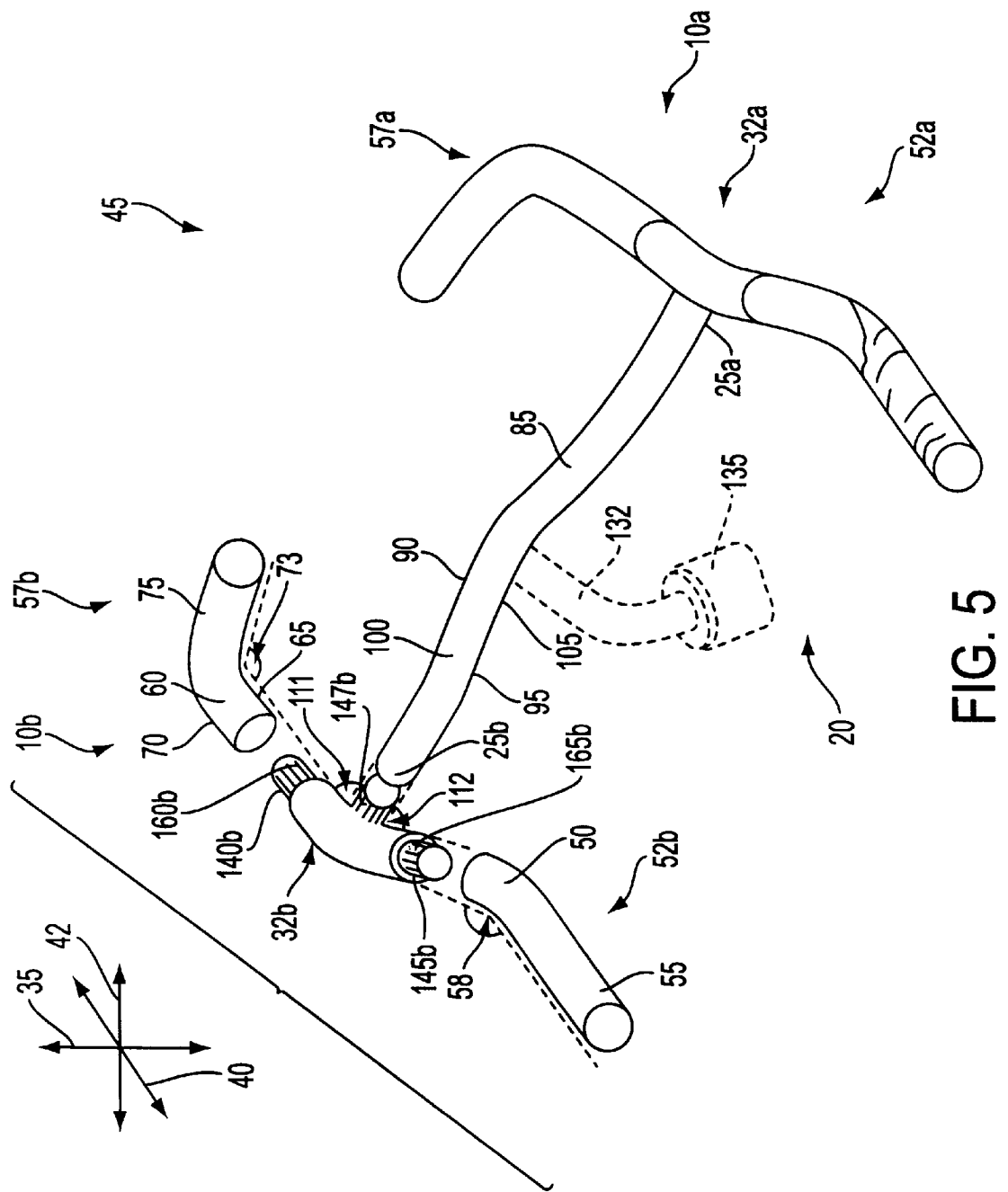
FIG. 5 is a partial, perspective, exploded view illustrating an alternate embodiment of this invention in which bar ends are an integral part of the ends of a straight-across handlebar.

Because the clamp 110 is circular, the bar end 10 can be fastened to the terminus 25 of the crossbar 85 at a variety of angles or rotation. It is obvious that a complete handlebar with integral bar ends 10 can easily be fabricated. In other words it would be easy to fabricate bar ends 10, without clamp sections 30 and to weld or otherwise permanently fasten these bar ends 10 to the termini 25 of a crossbar 85. In this version, however, the angular relationship of the bar ends 10 to the crossbar 85 would not be adjustable at will. Thus some flexibility will be sacrificed. But bicycle designers can easily determine the optimum angle of attachment to satisfy the needs of most riders. FIG. 5 illustrates just such a complete handlebar 45. In FIG. 5, the left side is shown exploded to better illustrate the method of attachment.

The handlebar 45 shown on FIG. 5 is analogous to the bar end 10/handlebar 15 combination shown on FIG. 2. The handlebar 45 of FIG. 5 comprises in one integral unit several component parts. The central component is the crossbar 85. The crossbar 85 may be considered to have a front 90, a rear 95, an up surface 100 and a down surface 105. The crossbar has two termini 25. At right angles to the crossbar 85 at each terminus 25 is attached a bar end 10.

The bar end 10 comprises a rear tube 52, a medial fitting 32 and a forward tube 57. The medial fitting 32 has a forward projection 140, a rear projection 145 and a side projection 147. The fitting 32 may be considered to have a vertical axis 35, a horizontal axis 40 and a transverse axis 42. These axes apply equally to the entire bar end 10 and handlebar 45 as well as the fitting 32.

The forward and rear projections 140, 145 are not coplanar and join the fitting 32 at complex first and second angles 111, 112. The forward and rear projections 140, 145 can extend from the fitting 32 at any desired first and second angle 111, 112. Preferably, in relation to the vertical axis 35, the horizontal axis 40, and the transverse axis 42, the forward projection 140 projects upwards and inwards from the fitting 32 and the rear projection 145 projects downwards and rearwards from the fitting 32. The projections 140, 145 are adapted to receive the tubes 52, 57 and preferably have grooves 160 for retention of adhesive 165. The side projection 147 is generally transverse to the fitting 32 and is adapted to fit inside the terminus 25 of the crossbar 85. The side projection 147 is adapted to receive the crossbar 85 and has grooves 160 for retention of adhesive 165. For optimum strength the fitting 32 is made from a forging.

The side projection 147 is affixed to the terminus 25 of the crossbar 85. Preferably this projection 147 is fastened with adhesive 165 but fastening could also be accomplished by welding or brazing or equivalent methods of permanent attachment. Affixed to the rear projection 145 is the rear tube 52. Preferably the rear tube 52 is affixed to the rear projection 145 with adhesive 165 but fastening could also be accomplished by welding or brazing or equivalent methods of permanent attachment. The rear tube 52 is identical to the rear tube previously described. It has two segments: a downward pointing portion 50 and a horizontal portion 55 which are at a fourth angle 58 to each other. In the preferred orientation, as shown on FIG. 5, the downward portion 50 extends downward and rearward at a first angle 112 from the fitting 32 and the horizontal portion 55 extends rearward, approximately parallel to the horizontal axis 40.

Affixed to the forward projection 140 is the forward tube 57. Preferably the forward tube 57 is affixed to the forward projection 140 with adhesive 165 but fastening could also be accomplished by welding or brazing or equivalent methods of permanent attachment. The forward tube 57 is identical to the forward tube 57 previously described. It has two segments: an upwards pointing portion 60 and inwards pointing segment 75. In the preferred orientation, as shown on FIG. 1, the upper portion 60 extends generally upwards at a second angle 111 from the fitting 32 and the inner portion 75 extends forwards and inwards at a third angle 73 from the upper portion 60. The upper portion 60 has an inner side 65 and an outer side 70.

The downward 50 and upper 60 segments may be straight and extend from the crossbar 85 at any desired angle 111, 112. The preferred angles 111, 112 are about 45 degrees. Alternatively, the downward segment 50 may be U-shaped as in a racing handlebar.

The complete handlebar 45 is attached to a stem 132 which is attached to the bicycle 20 by conventional means 135. The complete handlebar 45 can have the alternate shape of bar ends 10 as shown in FIG. 3. Its use would be entirely the same as the methods of use shown in FIGS. 4A through 4E.

The handlebar 45 can be made of steel but is preferably made from ⅞ inch diameter aluminum tubing. The preferred dimensions of the bar end 10 are: downward segment 50—approximately 3⅓ inches long; horizontal segment 55—approximately 3⅓ inches long: upper segment 60—approximately 3⅓ inches long; and inwards segment 76—approximately 3⅓ inches long. The preferred fourth angle 58 between the downward portion 50 and horizontal portion 55 is 60°. The preferred third angle 73 between the upper portion 60 and inwards portion 76 is 60°.

While a handlebar incorporating a fitting 32 and attachment of the bar ends 10 with adhesive may be the preferred method of fabrication, it will be obvious to those skilled in the art to which this invention pertains that equivalent methods fabrication can be devised.

Figure 6:
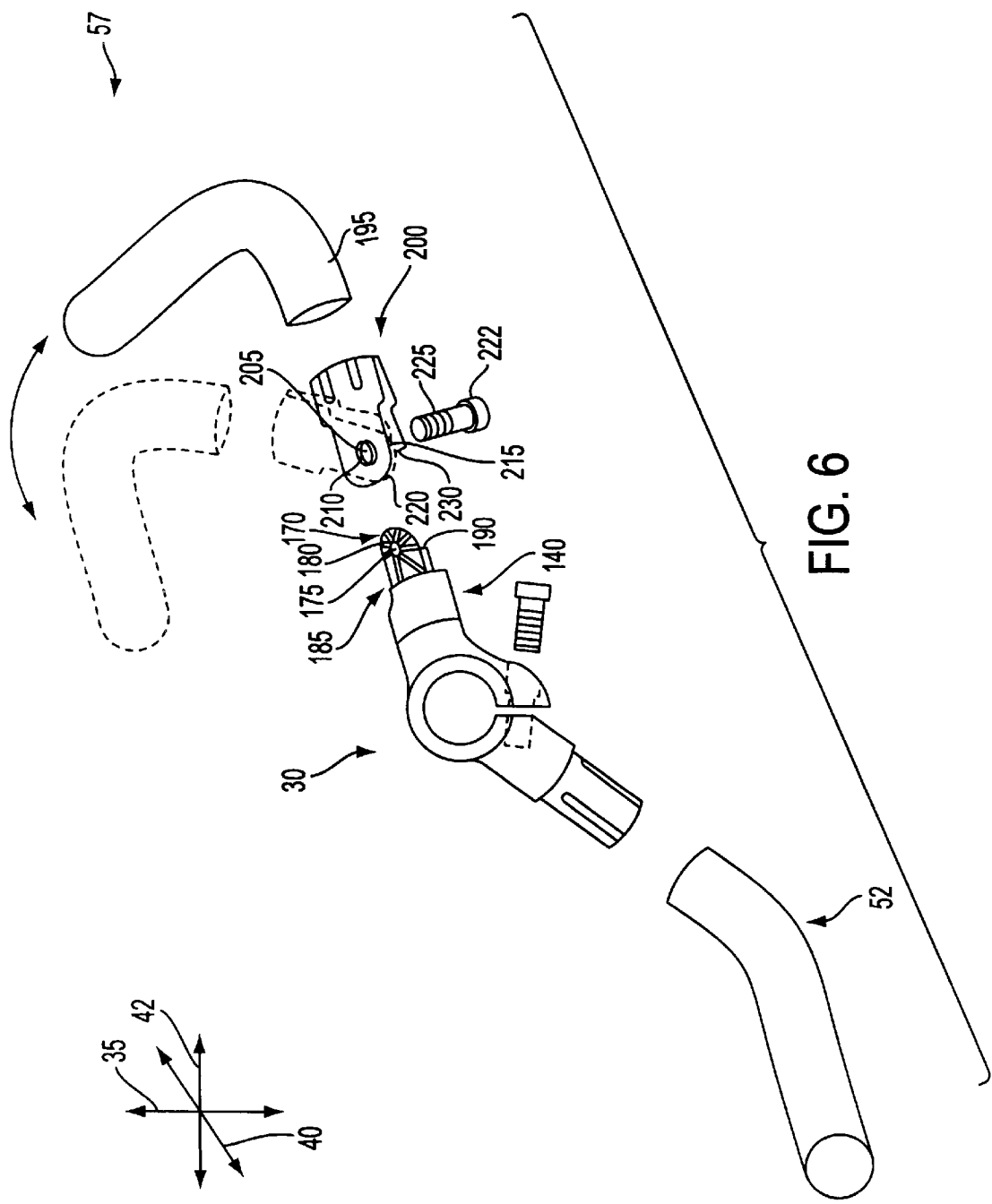
FIG. 6 is an exploded, perspective view of the an alternate, right hand embodiment of this invention in which the angle at which the forward projection and forward tube meet is adjustable in the vertical plane.

FIG. 6 is an exploded, perspective view of the an alternate embodiment of this invention in which the angle at which the forward protection 140 and the forward tube 57 meet is adjustable in the vertical plane 35. Adjustment is shown by the dotted lines and double-headed, curved arrow on FIG. 6. In this variation, the projection 140 terminates in a circular flange 170 with a central, blind, threaded hole 175. The inner surface 180 of the flange is planar and serrated, while the outer surface 185 is rounded. The design incorporates a safety stop 190. The lower end 195 of the forward tube 57 is fitted with a solid cap 200, which is essentially a mirror image of the flange 170 on the projection 140. The cap 200 has an inner, planar surface 220 which is serrated and an outer curved surface 215. The hole 205 is a through hole with a recess or countersink 210 in the outer curved surface 215 to accommodate the head 222 of the attachment screw 225. The design of the cap 200 also accommodates a safety stop 230.

In use the planar surfaces 180, 220 are mated. Because of the serrations, they can be mated only at discrete angular intervals in the vertical direction. Once a desired angle is selected, the assembly is secured with the screw 225. If the screw 225 were to work loose during use, the safety stops 190, 230 would ensure that the forward tube 57 did not rotate all the way down thus preventing undue injury to the rider.

Figure 7:
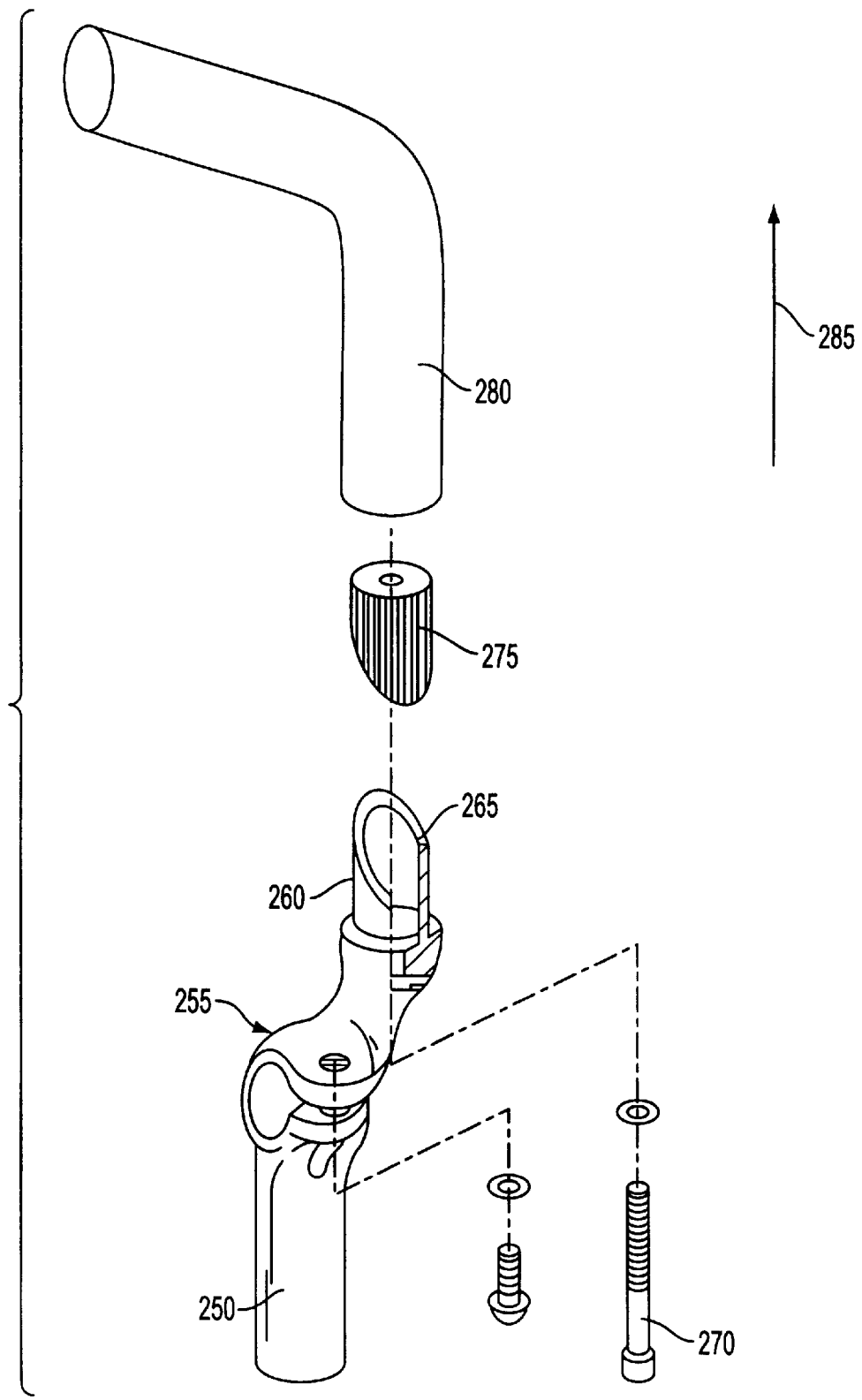
FIG. 7 is an exploded perspective view of the prior art device of U.S. Pat. No. 5,421,220.

From FIG. 7 it will be obvious to those familiar with the art to which this invention pertains that the device described in U.S. Pat. No. 5,421,220 is quite different from the present invention 10. To begin with, the device of U.S. Pat. No. 5,421,220 only has a short rear projection 250 extending straight out from its main body 255. There is no curved rear tube 52 attached to this projection 250. Secondly, the forward projection 260 extends straight forward from but curves to the side of the main body 255. Also, this projection 260 is hollow on both ends and ends in a tapered joint 265. Adjustably attached to this forward projection 260 by a bolt 270 and washer 275 is a forward tube 280. This arrangement allows the forward tube 280 to rotate around the front rear axis 285 and to be fastened at any desired angle. By contrast, the forward tube 57 of the present invention 10 is permanently fixed and cannot rotate about its front rear axis.

Consequently, the device of U.S. Pat. No. 5,421,220 cannot be used in the same way as the present invention 10. It is obvious from other drawings in the Patent that the inventor intended the device of U.S. Pat. No. 5,421,220 to be clamped vertically to the crossbar 85. By contrast, the present invention 10 is intended to be clamped at a gentle angle to the crossbar 85. Also, the present invention affords the rider five comfortable positions for placing his hands. See FIGS. 2 and 4A through 4E. It is obvious that hands cannot be comfortably placed on the rear projection of U.S. Pat. No. 5,421 ,220. Consequently, it only affords the rider three positions for placing his hands.

The bar end 10 and handlebar 45 have been described with reference to a particular embodiment and several variations. However, it should be obvious to those skilled in the art to which this invention pertains that other modifications and enhancements can be made without departing from the spirit and scope of the claims that follow.

I claim:

1. A bar end for attachment to a terminus of a straight handlebar for a bicycle; said bar end comprising:
    a. a clamp section including a means for clamping to said terminus, a forward projection and a rear projection;
    b. a rear tube affixed to said rear projection; said rear tube including a downward portion extending downward and rearward at a first angle from said clamp section and a horizontal portion extending rearward from said downward portion; and
    c. a forward tube affixed to said forward projection; said forward tube including an upper portion, having an inner side and an outer side, extending upwards and forwards at a second angle from said clamp section and an inwards portion extending forwards and inwards at a third angle from said upper portion.

2. A bar end as claimed in claim 1 further comprising a means for angular adjustment, incorporated where said forward tube is affixed to said forward projection, whereby said second angle may be varied in the vertical plane.

3. A bar end as claimed in claim 1 in which said first angle is 45 degrees.

4. A bar end as claimed in claim 1 in which said downward portion is U-shaped.

5. A bar end as claimed in claim 1 in which said forward tube is affixed to said forward projection and said rear tube is affixed to said rear projection with adhesive.

6. A bar end as claimed in claim 5 in which said forward projection and said rear projection further include grooves adapted to receive said adhesive.

7. A bar end as claimed in claim 1 in which said forward tube is welded to said forward projection and said rear tube is welded to said rear projection.

8. A bar end as claimed in claim 1 in which said forward tube is brazed to said forward projection and said rear tube is brazed to said rear projection.

9. A bar end for attachment to a terminus of a straight handlebar for a bicycle; said bar end comprising:
    a. a clamp section having a forward and a rear and including means for clamping to said terminus;
    b. a rear tube, affixed to said rear, including a downward portion extending downward and rearward at a first angle from said clamp section and a horizontal portion extending rearward from said downward portion; and
    c. a forward tube, affixed to said forward, including an upper portion, having an inner side and an outer side, extending upwards and forwards at a second angle from said clamp section and an inwards portion extending forwards and inwards at a third angle from said upper portion.

10. A bar end as claimed in claim 9 further comprising a means for angular adjustment, incorporated where said forward tube is affixed to said forward projection, whereby said second angle may be varied in the vertical plane.

11. A bar end as claimed in claim 9 in which said first angle is 45 degrees.

12. A bar end as claimed in claim 9 in which said downward portion is U-shaped.

13. A bar end as claimed in claim 9 in which said forward tube is affixed to said clamp section and said rear tube is affixed to said clamp section with adhesive.

14. A bar end as claimed in claim 13 in which said forward projection and said rear projection further include grooves adapted to receive said adhesive.

15. A bar end as claimed in claim 9 in which said forward tube is welded to said clamp section and said rear tube is welded to said clamp section.

16. A bar end as claimed in claim 9 in which said forward tube is brazed to said clamp section and said rear tube is brazed to said clamp section.

* * * * *